Aug. 5, 1924.
F. H. GANSE
1,504,118
ADHESIVE POT
Filed July 15, 1919
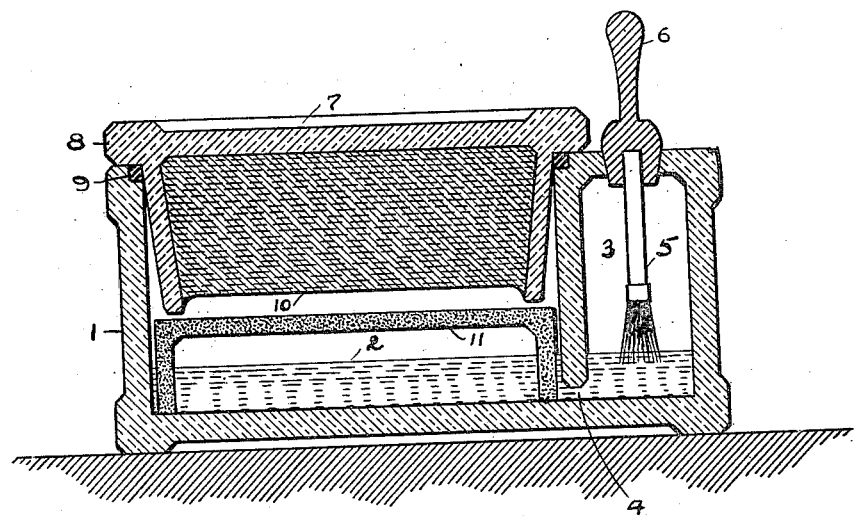

Patented Aug. 5, 1924.

1,504,118

UNITED STATES PATENT OFFICE.

FREDERICK H. GANSE, OF TULARE, CALIFORNIA.

ADHESIVE POT.

Application filed July 15, 1919. Serial No. 311,022.

*To all whom it may concern:*

Be it known that I, FREDERICK H. GANSE, a citizen of the United States, residing at Tulare, county of Tulare, State of California, have invented certain new and useful Improvements in Adhesive Pots, whereof the following is a specification.

This invention relates to paste pots of the "ever-moist" variety. Ordinarily such pots comprise a body of solid paste, and a body of water in proximity thereto.

In carrying out my invention I make use of capillary attraction to convey moisture to a position approximating the paste for the purpose of keeping the same soft, and to this end I make a paste pot comprising a receptacle for liquid, an inverted cup containing the paste, and a capillary medium approximating both the liquid and the paste for approximating the liquid to the surface of the paste and prevent splashing of the liquid against the paste, or out of the liquid receptacle.

In the accompanying one sheet of drawing I have illustrated my invention in its preferred form.

The figure is a sectional elevation of a paste pot.

The vessel 1 is capable of containing liquid, as water 2. At one side of the vessel 1 may be a chamber 3 communicating with it by a passage 4, and adapted to hold a brush 5, when not in use. The handle 6 of the brush preferably makes a close fit with mouth of chamber 3, as shown.

Fitting into the main body of the vessel 1 is the inverted cup 7, which, when in place has its open mouth downward. This cup may rest upon the edge of vessel 1 by a flange 8, or otherwise, and may be provided with a flexible packing 9 to hold said cup in position and at the same time form an hermetically closed chamber. Cup 7 may also have contracting walls, to facilitate its insertion into vessel 1, and also to better retain its contents, the paste 10.

In the lower part of vessel 1, under cup 7, I arrange the capillary medium 11, which may consist of an inverted cup of unglazed porcelain, or other material. This cup may rest with its edges in the water, which will then be raised by capillarity to its bottom portion and will thereby preserve the moist or soft condition of the paste 10.

For use, the cup 7 may be lifted out and turned up, and the brush applied.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to-wit:—

1. A paste pot comprising a liquid container, a paste container above said liquid container, and removable means therebetween to carry the moisture into proximity to said paste.

2. A paste pot comprising a liquid container, a paste container above said liquid container, and a capillary medium between those two parts.

3. A paste pot comprising a liquid container, a paste container and a capillary medium consisting of an inverted cup removably mounted between both containers.

4. A paste pot comprising a water containing vessel, an inverted cup for paste, inserted into said vessel, and a capillary medium between said water and said paste.

5. A paste pot comprising a water containing vessel, an inverted cup for paste, inserted into said vessel, and an inverted cup of porous material in said vessel and under said paste container.

6. A paste pot comprising a water containing vessel, an inverted cup for paste, inserted into said vessel, and an inverted cup of unglazed porcelain in said water vessel and immediately under the mouth of said paste container.

7. A paste pot comprising a liquid container, a paste container above said liquid container, and removable means therebetween to prevent splashing of the liquid in the liquid container.

8. A paste pot comprising a liquid container, a paste container, said paste container adapted to form the cover of said liquid container and combined means between said containers to carry moisture from said liquid container into proximity to said paste container and also to prevent splashing of the liquid in the liquid container.

In testimony, that I claim the foregoing I have hereto set my hand in the presence of two witnesses this 30 day of June, 1919.

FREDERICK H. GANSE.

Witnesses:
 BERNICE L. ROBB,
 F. C. HULBERT.